United States Patent [19]

Broden

[11] Patent Number: 5,287,746
[45] Date of Patent: Feb. 22, 1994

[54] MODULAR TRANSMITTER WITH FLAME ARRESTING HEADER

[75] Inventor: David A. Broden, Chanhassen, Minn.

[73] Assignee: Rosemount Inc., Eden Prairie, Minn.

[21] Appl. No.: 868,451

[22] Filed: Apr. 14, 1992

[51] Int. Cl.[5] .............................. G01L 7/08; G01L 9/00
[52] U.S. Cl. ........................................ 73/706; 73/720; 73/726; 73/756
[58] Field of Search ................. 73/706, 756, 708, 720, 73/721, 722, 728, 717, 718, 719, 723, 724, 725, 726, 727, 754; 338/4, 42; 336/30; 361/283

[56] References Cited

U.S. PATENT DOCUMENTS

| | | | |
|---|---|---|---|
| 3,851,530 | 12/1974 | Symonds et al. | 73/706 |
| 4,833,922 | 5/1989 | Frick et al. | 73/756 |
| 4,970,898 | 11/1990 | Walish et al. | 73/706 |

FOREIGN PATENT DOCUMENTS

| | | |
|---|---|---|
| 0080186 | 6/1983 | European Pat. Off. |
| 0209495 | 1/1987 | European Pat. Off. |
| 688097 | 1/1940 | Fed. Rep. of Germany |
| 3838312A1 | 5/1990 | Fed. Rep. of Germany |
| C-4031509 | 10/1990 | Fed. Rep. of Germany |
| 63-3233A | 1/1988 | Japan |

Primary Examiner—Donald O. Woodiel
Attorney, Agent, or Firm—Westman, Champlin & Kelly

[57] ABSTRACT

A transmitter with a flame arresting header senses a pressure of a process fluid with a diaphragm which is sealed to the header. The diaphragm transfers the pressure of the process fluid acting an outer surface of the diaphragm to a fill fluid that isolates an inner surface of the diaphragm, and a pressure sensor enclosed in the transmitter senses the pressure of the fill fluid providing an output representative of the pressure of the process fluid. The header includes a chamber on the header's outer face and a passageway extending from the chamber to a tapered opening inside the transmitter with a first portion adjacent to the tapered opening shaped to receive an inlet tube leading to the sensor and a second flame isolating portion open to the chamber. The fill fluid fills the chamber, the passageway, and the inlet tube and is sealed in with a tapered seal pressed into the tapered opening around the inlet tube. The second passageway portion is shaped for flame isolating the tapered seal from the process fluid.

12 Claims, 3 Drawing Sheets

MODULAR TRANSMITTER WITH FLAME ARRESTING HEADER

BACKGROUND OF THE INVENTION

The present invention relates to modular pressure transmitters with flame arresting or quenching headers coupled to process pressure lines.

Flammable mixtures are often present in an atmosphere outside of a pressure transmitter or in a process fluid which is being sensed by a pressure sensor in the transmitter. Various types of protection reduce the likelihood that an ignition of flammable gas inside the transmitter will ignite a flammable mixture outside the transmitter. For example, transmitter covers are fitted with flame quenching threads that cool ignited gas as the gas is vented from the transmitter to a temperature below the temperature needed to ignite a flammable mixture outside the transmitter.

Some transmitters are equipped with multiple protection arrangements to reduce the likelihood of igniting a flammable mixture outside the transmitter after one of the protection arrangements fails or is damaged. In some applications, a flame quenching path is desired that effectively contains ignition of a flammable mixture inside a transmitter housing even after resilient seals such as O-rings and thin foil barriers such as isolator diaphragms have been damaged or removed and after isolator fluids have leaked out and welds have failed.

In the Walish et al. U.S. Pat. No. 4,970,898, assigned to the assignee of the present application, a transmitter is shown in which a plug includes a liquid-filled passageway shaped to provide flame quenching.

Some pressure transmitters utilize a modular construction such as the transmitter disclosed in the Frick et al. U.S. Pat. No. 4,833,922, also assigned to the assignee of the present application, in which a tapered mechanical seal is used to couple process fluid from an isolator to a tube leading to a pressure sensor.

SUMMARY OF THE INVENTION

The present invention includes a transmitter for sensing a pressure of a process fluid. A pressure sensor is enclosed in the transmitter for providing an output representative of pressure. A header includes a chamber on an outer face and a passageway extending from the chamber to a tapered opening on an inner face of the header, which is inside the transmitter. The passageway includes a first portion adjacent to the tapered opening shaped to receive an inlet tube leading to the sensor and a second flame isolating portion open to the chamber. A flexible isolator diaphragm is sealed to the header to overlie the chamber. The diaphragm transfers the pressure of the process fluid acting on an outer surface of the diaphragm to a substantially noncompressible fill fluid that fills the chamber, the passageway, and the inlet tube. The pressure sensor senses the pressure of the fill fluid caused by pressure acting on the isolator diaphragm.

A tapered seal is pressed into the tapered opening around the inlet tube where the header interfaces with the sensor for sealing in the fill fluid. The flame isolating second portion of the passageway is shaped to provide flame isolation for flame isolating the tapered seal around the inlet tube, and the interior of the inlet tube from the process fluid.

DETAILED DESCRIPTION OF THE PREFERRED EMBODIMENTS

Figure 1:
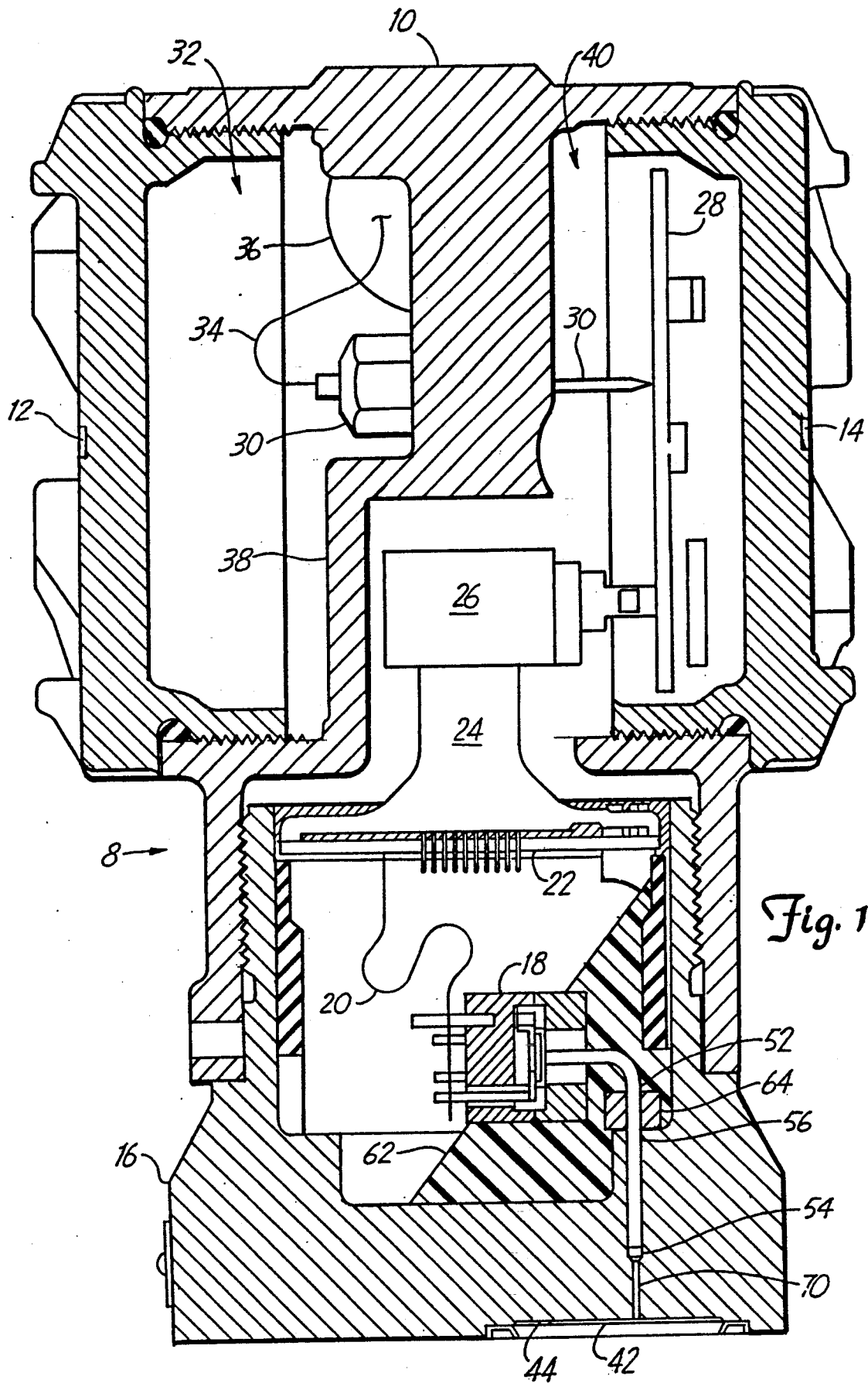
FIG. 1 is a cross-sectional view of a pressure transmitter for sensing absolute or line pressure according to the present invention.

Referring to FIG. 1, a pressure transmitter 8 includes a flame arresting header 16 for connecting to process fluid lines. Transmitter 8 includes a housing 10 having openings closed off by a wiring cover 12 and an electronics cover 14 as well as header 16. Transmitter 8 encloses a pressure sensor 18 providing an output representation of pressure which has output leads 20 coupled to a first circuit board 22 which includes circuitry for processing sensor signals. Leads 24 of circuit board 22 are coupled via a rotatable coupling 26 to a circuit board 28. Circuit board 28 includes circuitry which generates an output signal representative of pressure which is coupled via sealed feedthroughs 30 to a wiring compartment 32. Wiring compartment 32 receives loop circuit leads 34 from a sealed conduit entry 36. Loop circuit leads 34 connect to sealed feedthroughs 30 to receive the transmitted output signal. A wall 38 sealingly separates wiring compartment 32 from a sensor compartment 40.

Threaded joints at covers 12 and 14, header 16, conduit entry 36, and housing 10 provide flame-quenching joints for containing any ignition which may occur inside the transmitter's compartments 32 and 40. This flame containment is provided independent of pressure sensor 18.

Figure 2:
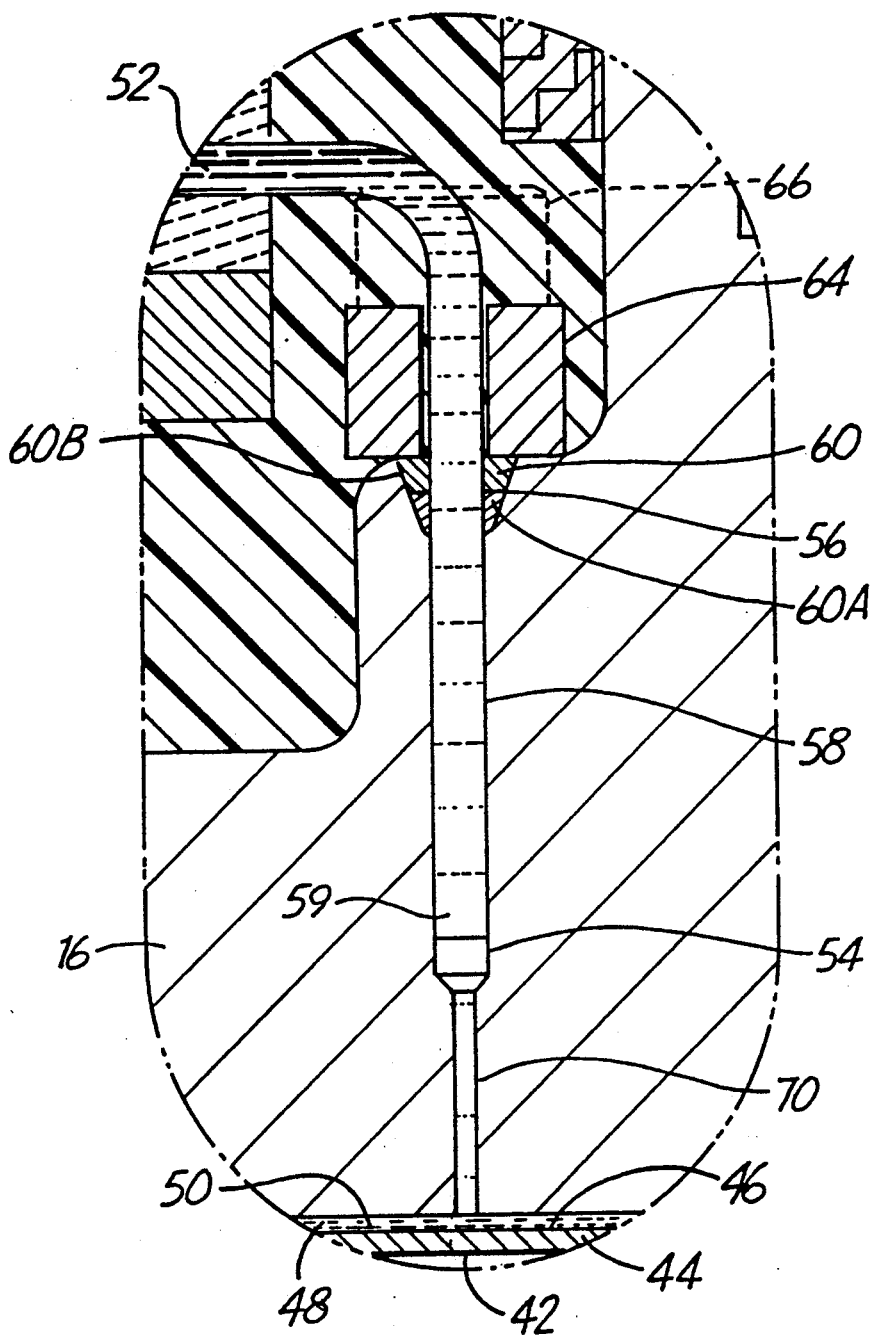
FIG. 2 is an enlarged view of a flame isolation arrangement shown in FIG. 1.

Referring to FIG. 2, an outer surface 42 of an isolator diaphragm 44 receives pressure from a process fluid outside the transmitter. Although it is not illustrated in the diagrams, this process fluid can be coupled to the transmitter by various flanges or unions. Isolator diaphragm 44 is flexible and transfers forces caused by process fluid pressure to a fluid-isolated inner isolator surface 46. The outer periphery of isolator diaphragm 44 is sealingly welded to header 16 over a chamber 48 to isolate the process fluid from the interior of chamber 48. Chamber 48 is filled with a substantially noncompressible isolator fluid 50, such as silicone oil, which receives the pressure transferred by isolator diaphragm 44.

Referring to FIGS. 1 and 2, a passageway 54 in header 16 extends from chamber 48 to a tapered opening 56 on header 16 inside transmitter 8. A first portion 58 of passageway 54 is shaped to receive an end portion 59 of an inlet tube 52 that opens to pressure sensor 18. Isolator fluid 50, which is also referred to as a fill fluid, fills chamber 48, passageway 54, and inlet tube 52, thereby transferring pressure from inner isolator surface 46 to pressure sensor 18. A tapered seal 60 is pressed into tapered opening 56 to seal around inlet tube 52 and prevent leakage of fill fluid 50. Tapered seal 60 typically includes a softer material 60A and a harder backing plate 60B to permit forcing the softer material tightly against inlet tube 52. A semi-flexible material 62 is poured in over pressure sensor 18 to fill the voids around the sensor and the interior cavity of header 16 to provide shock-mounting when the material 62 has set up. The material 62 is shown schematically in FIG. 1. As shown, material 62 preferably only fills header 16 diagonally over the inlet tube half of sensor 18 so that material 62 does not come in contact with wiring 20.

Figure 3:
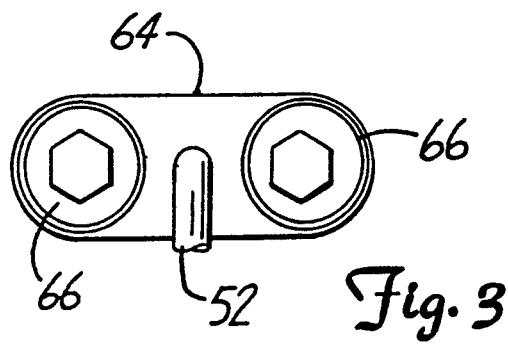
FIG. 3 is top view of a tube clamping arrangement shown in FIG. 1.

As illustrated in FIGS. 2 and 3, a plate 64 presses down on tapered seal 60 to maintain the seal. Screws 66 on the opposite end of the plate 64 clamp the plate 64 toward a shoulder surface on the interior of the header. The plate 64 presses on the harder material 60B of seal 60 and forces the softer material 60A to seal on the inlet tube 52 and around opening 56. This will assure that fill fluid 50 does not escape through tapered opening 56.

Sensor compartment 40 contains energized electronic components and wiring for the sensor. Since the process fluid outside the transmitter may be a flammable gas, compartment 40 is preferably isolated from the process fluid even under fault conditions, such as when an isolator diaphragm 44 has broken, fill fluid 50 has drained out, and seal 60 or pressure sensor 18 have broken open. Furthermore, a flame proof coupling which does not depend on mechanical joints or welds is desired to flame isolate the modular installation of the sensor 18 inside the transmitter during fault conditions. A second portion 70 of passageway 54 is disposed between chamber 48 and tapered seal 60 and provides a flame isolation path between the interior of the transmitter and sensor 18 and the exterior of the transmitter. Second passageway portion 70 is placed to extend through a portion of header 16 which is free of mechanical joints or welds. Additionally, second passageway portion 70 is shaped to provide flame isolation so as to isolate tapered seal 60 around inlet tube 52 from the process fluid. As shown, second passageway portion 70 is typically a tube with a very small diameter so that flames will not sustain themselves as such flames move along the second passageway portion.

New types of machining such as electric discharge machining allow fabrication of smaller diameter holes in second passageway portion 70 which minimizes the required length of second portion 70. A short length is desired for second portion 70 for an improved hydraulic time response. In one embodiment, second portion 70 has an approximate length of 8.1 mm and an approximate diameter of 0.34 mm.

Because second portion 70 of passageway 54 flame isolates sensor compartment 40 from the process fluid, the sensor 18 does not require separate flame isolation. Instead, the actual structure of transmitter 8 and specifically header 16 provide the flame isolating protection. Consequently, a wide variety of sensors may be installed in transmitter 8, such as a Solid State Gauge Pressure sensor, while still maintaining the flame isolating protection. Because the only flame path from the exterior to the sensor is through the second portion 70 of passageway 54, and because the passageway goes through a unitary, single piece body and is not constructed of multiple parts or fabrications, passageway 54 is more reliable and cost-effective, and does not require separate testing. In addition, the present invention allows or permits use of energy levels in sensor 18 and the electronics that are at or above ignition potential of the process fluid. Moreover, passageway 54 will protect the process fluid from flames if a spark occurs in either sensor 18 or the circuitry in sensor compartment 40.

Figure 4:
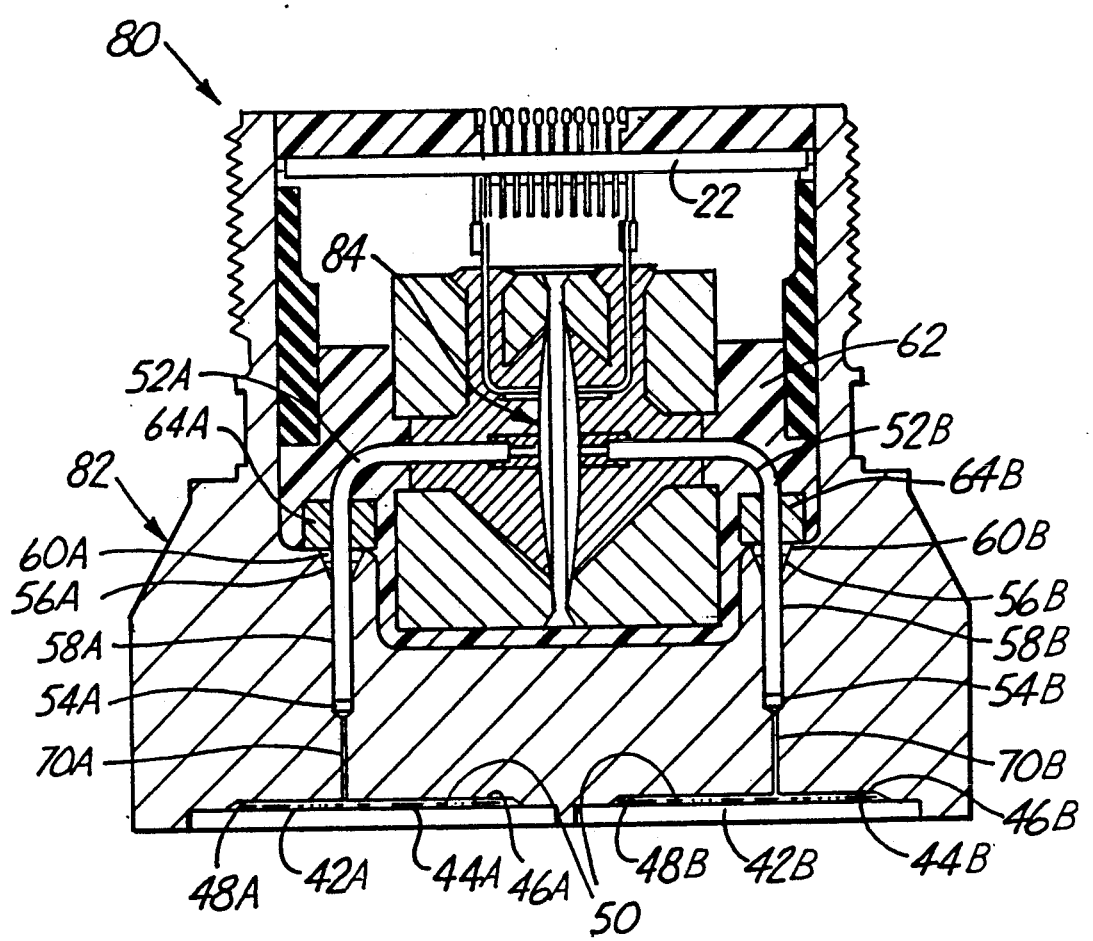
FIG. 4 is a cross-sectional view of a header for a differential pressure transmitter according to the invention.

Referring to FIG. 4, another preferred embodiment of the present invention is a differential pressure transmitter 80. A housing, covers, and electronics similar to those of transmitter 8 and illustrated in FIG. 1 are included in transmitter 80 but not illustrated. A header portion 82 of the differential pressure transmitter 80 is illustrated in FIG. 4 in cross-section. The transmitter 80 includes a differential pressure sensor 84 which provides an output representative of a differential pressure between two different pressures in a process fluid. Two inlet tubes 52A and 52B extending outwardly from opposite ends of pressure sensor 84 open to the sensor. The flame quenching portion of the transmitter 8 as generally illustrated in FIG. 2 is essentially duplicated in the differential pressure transmitter. A first passageway 54A receives an end portion of inlet tube 52A and extends downwardly from one end of differential sensor 84 to a chamber 48A, while a second passageway 54B receives an end portion of inlet tube 52B and extends down to a chamber 48B from the opposite end of differential sensor 84. Two isolator diaphragms 44A and 44B, which are essentially the same as diaphragm 44 of the transmitter 8 are sealingly welded to header 82 over chambers 48A and 48B, respectively. Diaphragm 44A transfers pressure from a process fluid exerted on an outer surface 42A of diaphragm 44A to a substantially noncompressible isolator fluid 50 filling chamber 48A, passageway 54A, and inlet tube 52A. Similarly, diaphragm 44B transfers pressure from the process fluid exerted on an outer surface 42B of diaphragm 44B to an isolator fluid 50 filling chamber 48B, passageway 54B, and inlet tube 52B. Differential sensor 84 senses the difference between the isolator fluid 50 at the sensor opening from inlet tube 52A and the isolator fluid 50 at the sensor opening from inlet tube 52B. Differential pressure transmitter 80 further includes two tapered openings 56A and 56B, two tapered seals 60A and 60B, and two first portions 58A and 58B and flame isolating second portions 70A and 70B of passageway 54A and 54B, which function essentially as described above for the flame quenching portion of the transmitter 8. Also, plates 64A and 64B press down on tapered seals 60A and 60B, respectively, to maintain the seals. In this way, the difference between the pressure of the process fluid at outer surface 42A and the pressure the process fluid at outer surface 42B is sensed, and all the internal electronic components of transmitter 80, including differential pressure sensor 84 are isolated from the process fluid outside of diaphragm 44A and the process fluid outside of diaphragm 44B.

Although the present invention has been described with reference to preferred embodiments, workers skilled in the art will recognize that changes may be made in form and detail without departing from the spirit and scope of the invention.

What is claimed is:

1. A transmitter for sensing a pressure of a process fluid comprising:
   sensing means disposed within the transmitter for providing an output representative of pressure;
   a header having a chamber on an outer face and a passageway extending from the chamber to a tapered opening inside the transmitter, the passageway having a first portion adjacent the tapered opening shaped to receive an inlet tube leading to the sensing means and having a second flame isolating portion open to the chamber;
   a diaphragm transferring the pressure of the process fluid acting on an outer surface of the diaphragm to a substantially noncompressible fill fluid that isolates an inner surface of the diaphragm, the fill fluid filling the chamber, the passageway and the inlet tube, and the pressure of the fill fluid being sensed by the sensing means, where an outer periphery of the diaphragm is sealingly attached to the outer face of the header; and a seal in the tapered opening around the inlet tube for sealing in the fill fluid, the flame isolating second portion of the passageway being shaped to provide flame isolation for flame isolating the tapered seal around the inlet tube and an interior of the inlet tube from the process fluid.

2. The transmitter of claim 1 wherein the flame isolating second portion of the passageway further isolates the sensing means from the process fluid.

3. The transmitter of claim 1 wherein the second portion of the passageway has a tubular shape with a diameter of less than 0.45 mm.

4. The transmitter of claim 3 wherein the second portion of the passageway has a length of more than 6 mm.

5. The transmitter of claim 1 wherein the passageway is free of adjoining joints in the header between the chamber and the tapered seal.

6. The transmitter of claim 5 wherein the passageway is free of adjoining welds in the header between the chamber and the tapered seal.

7. The transmitter of claim 6 wherein the header is a single block of material.

8. The transmitter of claim 1 wherein the transmitter is a differential pressure transmitter having a second diaphragm similar to the first diaphragm, the header having a second chamber and second passageway similar to and spaced away from the first chamber and first passageway respectively, the sensing means further comprises a second inlet tube, the second passageway being sealed by a second tapered seal, and the second passageway having a flame isolating second portion so that both the flame isolation portions isolate both tapered seals from the process fluid.

9. The transmitter of claim further comprising:
a transmitter housing joined to the header such that a space is formed between the header and the transmitter housing for enclosing the sensing means, and the flame isolating second portion of the passageway isolating the space enclosing the sensing means from the process fluid.

10. The transmitter of claim 9 further comprising:
a plurality of covers, the covers and the header closing off external openings of the housing.

11. The transmitter of claim 10 further comprising:
threaded joints at the covers, the header, and the housing to provide flame quenching capacity for containing ignitions inside of the housing.

12. The transmitter of claim 1 further comprising:
means for urging the seal into the tapered opening around the inlet tube to maintain the seal.

* * * * *

UNITED STATES PATENT AND TRADEMARK OFFICE
CERTIFICATE OF CORRECTION

PATENT NO. : 5,287,746
DATED : February 22, 1994
INVENTOR(S) : David A. Broden

It is certified that error appears in the above-indentified patent and that said Letters Patent is hereby corrected as shown below:

Column 6, line 12, after "claim" insert --1--.

Signed and Sealed this

Ninth Day of August, 1994

Attest:

BRUCE LEHMAN

Attesting Officer

Commissioner of Patents and Trademarks